United States Patent

Shamoto

[11] Patent Number: 5,999,733
[45] Date of Patent: Dec. 7, 1999

[54] HIGH SPEED ASSEMBLE PROCESSING SYSTEM

[75] Inventor: Eiji Shamoto, Kanagawa, Japan

[73] Assignee: NEC Corporation, Tokyo, Japan

[21] Appl. No.: 09/066,825

[22] Filed: Apr. 28, 1998

[30] Foreign Application Priority Data

Apr. 28, 1997 [JP] Japan .................................. 9-110819

[51] Int. Cl.⁶ .................................................. G06F 9/45
[52] U.S. Cl. ......................... 395/705; 395/707; 395/708; 711/221
[58] Field of Search ........................... 395/705, 707–709, 395/702; 712/242, 220; 711/202, 200, 221

[56] References Cited

U.S. PATENT DOCUMENTS

| | | | |
|---|---|---|---|
| 4,931,928 | 6/1990 | Greenfeld | 395/708 |
| 5,291,602 | 3/1994 | Barker et al. | 707/524 |
| 5,339,419 | 8/1994 | Chan et al. | 395/707 |
| 5,414,855 | 5/1995 | West | 395/708 |
| 5,768,564 | 6/1998 | Andrews et al. | 395/705 |

OTHER PUBLICATIONS

Eero Lassila, "A Macro Expansion Approach to Embedded Processor Code Generation," Proceedings of the 22nd EUROMICRO Conference on Beyond 200: Hardware and Software Design Strategies, EUROMICRO 96, Sep. 2–6, 1996, pp. 136–142.

Weise et al, "Programmable syntax macros," Proceedings of the conference on Programming language design and implementation in: PLDI '93, ACM SIGPLAN Notices, vol. 28, No. 6 (Jun. 1993), pp. 156–165.

William Clinger, "Macros that work," Proceedings of the eighteenth annual ACM symposium on Principles of programming languages in: POPL '91, pp. 155–162.

*Primary Examiner*—Tariq R. Hafiz
*Assistant Examiner*—Tuan Q. Dam
*Attorney, Agent, or Firm*—Sughrue, Mion, Zinn, Macpeak & Seas, PLLC

[57] ABSTRACT

In an assemble processing system, when a syntactical analysis procedure syntactically analyzes a source program, a macro definition procedure stores a macro definition program body of the source program in a macro definition area, and a macro reference procedure stores a macro formal parameter and a macro local symbol of the source program in a symbol table. After the operation of the syntactical analysis means is completed, the macro reference procedure deletes the stored macro formal parameter and the macro local symbol from said symbol table.

8 Claims, 14 Drawing Sheets

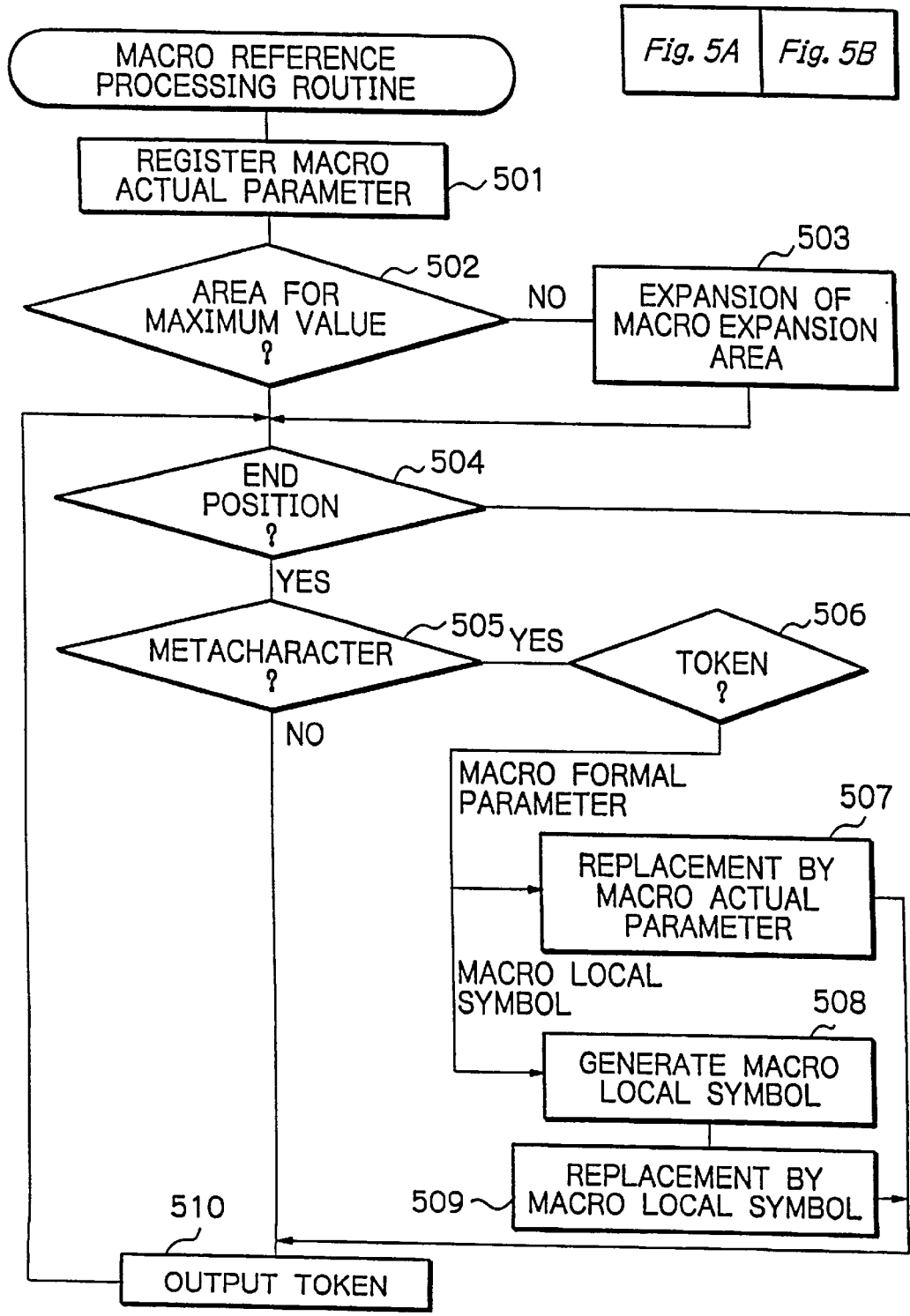

Fig. 6  PRIOR ART

EXAMPLE OF SOURCE PROGRAM

```
1  ml      macro    paral
2  local   lab
3  lab:    mov      a, #paral
4          br       !lab
5  endm
6
7  ml
8          end      10110110b
```

Lines 1–5: MACRO DEFINITION
Line 7: MACRO REFERENCE

Fig. 13

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|
| $ | m | o | v | $ | a | , | # | p | a | r | a | l | @ | l | a | b | : | @ | $ | b | r | $ | l | l | a | b | @ |

22a

HIGH SPEED ASSEMBLE PROCESSING SYSTEM

BACKGROUND OF THE INVENTION

1. Field of the Invention

The present invention relates to an assemble processing system and, more particularly, to an assemble processing system adapted to processing macro features.

2. Description of the Related Art

In a prior art assemble processing system, a macro expansion processing requires a considerably long time to generate a macro expansion area. This will be explained later in more detail. As a result, the time for executing a macro reference processing is remarkably increased. In addition, the memory area required is also increased.

SUMMARY OF THE INVENTION

It is an object of the present invention to reduce the time and the memory area required for executing a macro reference processing in an assemble processing system for processing macro features.

According to the present invention, in an assemble processing system, when a syntactical analysis procedure syntactically analyzes a source program, a macro definition procedure stores a macro definition program body of the source program in a macro definition area, and a macro reference procedure stores a macro formal parameter and a macro local symbol of the source program in a symbol table. After the operation of the syntactical analysis means is completed, the macro reference procedure deletes the stored macro formal parameter and the macro local symbol from said symbol table.

BRIEF DESCRIPTION OF THE DRAWINGS

The present invention will be more clearly understood from the description as set forth below, as compared with the prior art, with reference to the accompanying drawings, wherein:

FIGS. 5A and 5B are detailed flowcharts of the macro reference processing step of FIG. 2;

FIG. 6 is a diagram showing an example of the source program of FIG. 1;

FIG. 13 is a diagram showing the content of the macro definition area of FIG. 8.

DESCRIPTION OF THE PREFERRED EMBODIMENT

Before the description of the preferred embodiment, a prior art assemble processing system will be explained with reference to FIG. 1 through 7.

Figure 1:
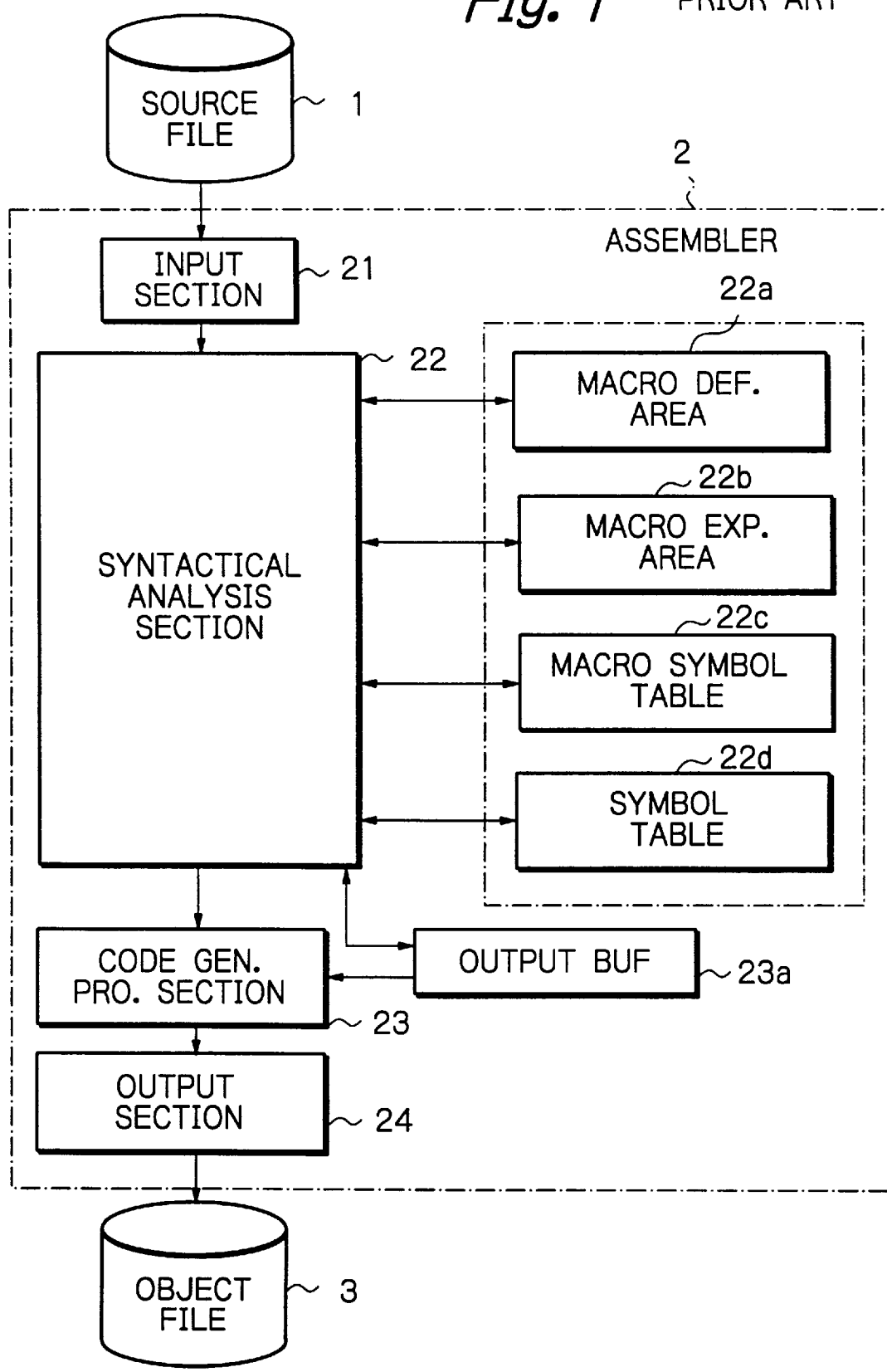
FIG. 1 is a diagram illustrating a prior art assemble processing system.

In FIG. 1, which illustrates a prior art assemble processing system, reference numeral 1 designates a source file, 2 designates an assembler, and 3 designates an object file.

The assembler 2 includes a source file input section 21 for reading the source file 1, a syntactical analysis section 22 for analyzing the syntax of a source code of the source file 1, a code generation processing section 23 for generating an object code after the completion of a syntactical analysis, and an object output file output section 24 for transmitting the object code to the object file 3.

Also, the assembler 2 includes a memory constructed by a macro definition area 22a, a macro expansion area 22b, a macro symbol table 22c and a symbol table 22d which are used in the operation of the syntactical analysis section 22.

Further, the assembler 2 includes an output buffer 23a which is used in the operation of the code generation processing section 23.

The syntactical analysis section 22 causes a lexical analysis routine to carry out a lexical analysis, to access and reference symbols. Also, a global symbol is stored into the symbol table 22d.

When the syntactical analysis section 22 finds a macro definition row, the syntactical analysis section 22 calls a macro definition processing routine. On the other hand, when the syntactical analysis section 22 finds a macro reference row, the syntactical analysis section 22 calls a macro reference processing routine.

A macro-defined program body is stored by the macro definition processing routine into the macro definition area 22a. Also, a macro formal parameter and a macro local symbol are stored by the macro definition processing routine into the macro symbol table 22c.

The macro-defined macro program body is read by the macro reference processing routine from the macro definition area 22a. Then, the macro formal parameter is replaced by a macro actual parameter and the local symbol is replaced by a symbol which is not overlapped with the other symbols, thus expanding the macro program body before the macro reference processing routine stores an expanded program into the macro expansion area 22b.

The operation of the syntactical analysis section 22 of FIG. 1 will be explained next with reference to FIG. 2.

First, at step 201, tokens are taken out one by one from the source file 1 that has been read. Then, a lexical analysis process is carried out, which will be explained late in detail.

Next, at step 202, it is determined whether or not there is a syntactical agreement between the tokens and a predetermined language specification. As a result, if there is an syntactical agreement, the control proceeds to step 203. On the other hand, if there is no syntactical agreement, the control returns to step 201.

At step 203, the syntax is identified. As a result, if the syntax is a macro definition syntax, the control proceeds to step 204 which carries out a macro definition processing routine which will be explained later in detail. Also, if the syntax is a macro reference syntax, the control proceeds to step 205 which carries out a macro reference processing routine which will be explained later in detail. Further, if the syntax is an end syntax, the control proceeds to step 206 which is a code generation processing routine carried out by the code generation processing section 23. Otherwise, the control proceeds to steps 207-1, . . . , 207-n which carry out meaning analysis processing operations corresponding to each of the tokens.

Figure 2:
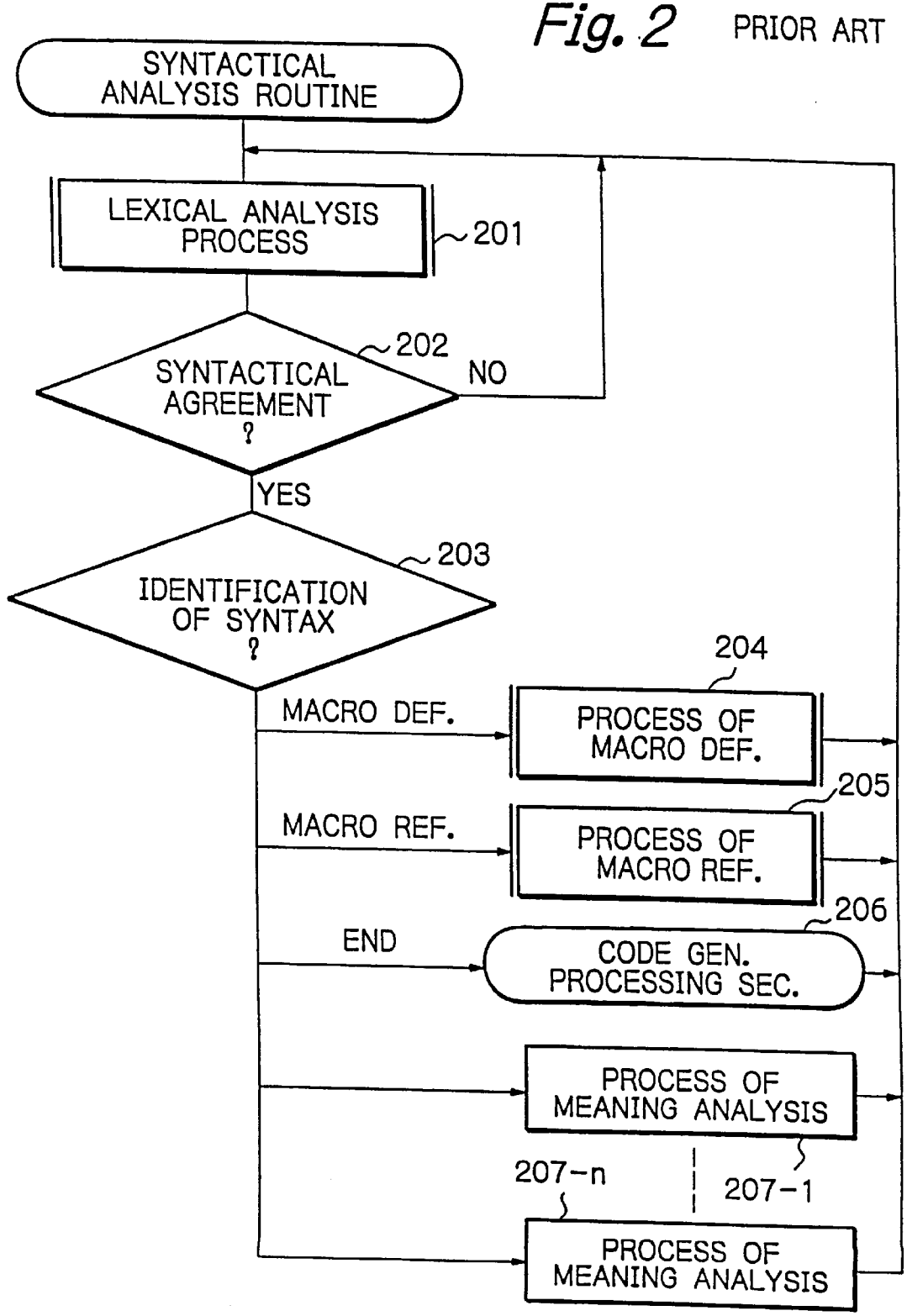
FIG. 2 is a flowchart showing the operation of the syntactical analysis section of FIG. 1.
Figure 3:
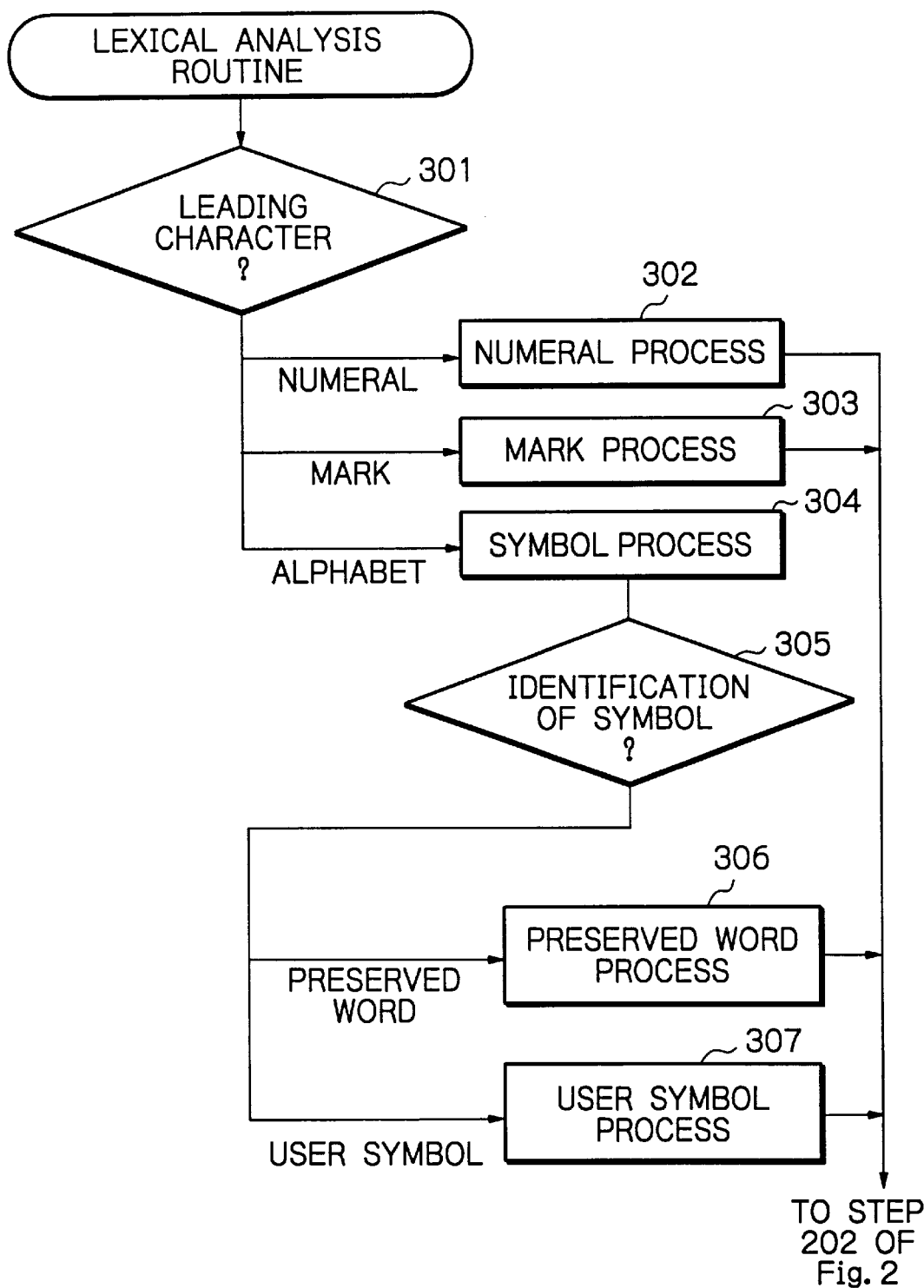
FIG. 3 is a detailed flowchart of the lexical analysis step of FIG. 2.

The lexical analysis processing step 201 of FIG. 2 is next explained in detail with reference to FIG. 3.

First, at step 301, a leading character of each token is identified. As a result, if the leading character is a numeral, the control proceeds to step 302 which carries out a numeral processing operation. Also, if the leading character is a mark, the control proceeds to step 303 which carries out a mark processing operation. Further, if the leading character is an alphabetic character, the control proceeds to step 304 which carries out a symbol processing operation.

At step 302, characters down to a space are taken in, and a character string that has been taken in is processed as numerals. Then, the control proceeds to step 202 of FIG. 2.

At step 303, characters down to a space are taken in, and a character string that has been taken in is processed as marks. Then, the control proceeds to step 202 of FIG. 2.

At step 304, characters down to a space are taken in, and a character string that has been taken in is processed as symbols. At step 305, it is determined whether the symbols are a reserved word or a user symbol. As a result, if the symbols are a reserved word, the control proceeds to step 306 which carries out a reserved word processing operation. On the other hand, if the symbols are a user symbol, the control proceeds to step 307 which carries out a user symbol processing operation. Then, the control at step 306 or 307 proceeds to step 202 of FIG. 2.

Figure 4:
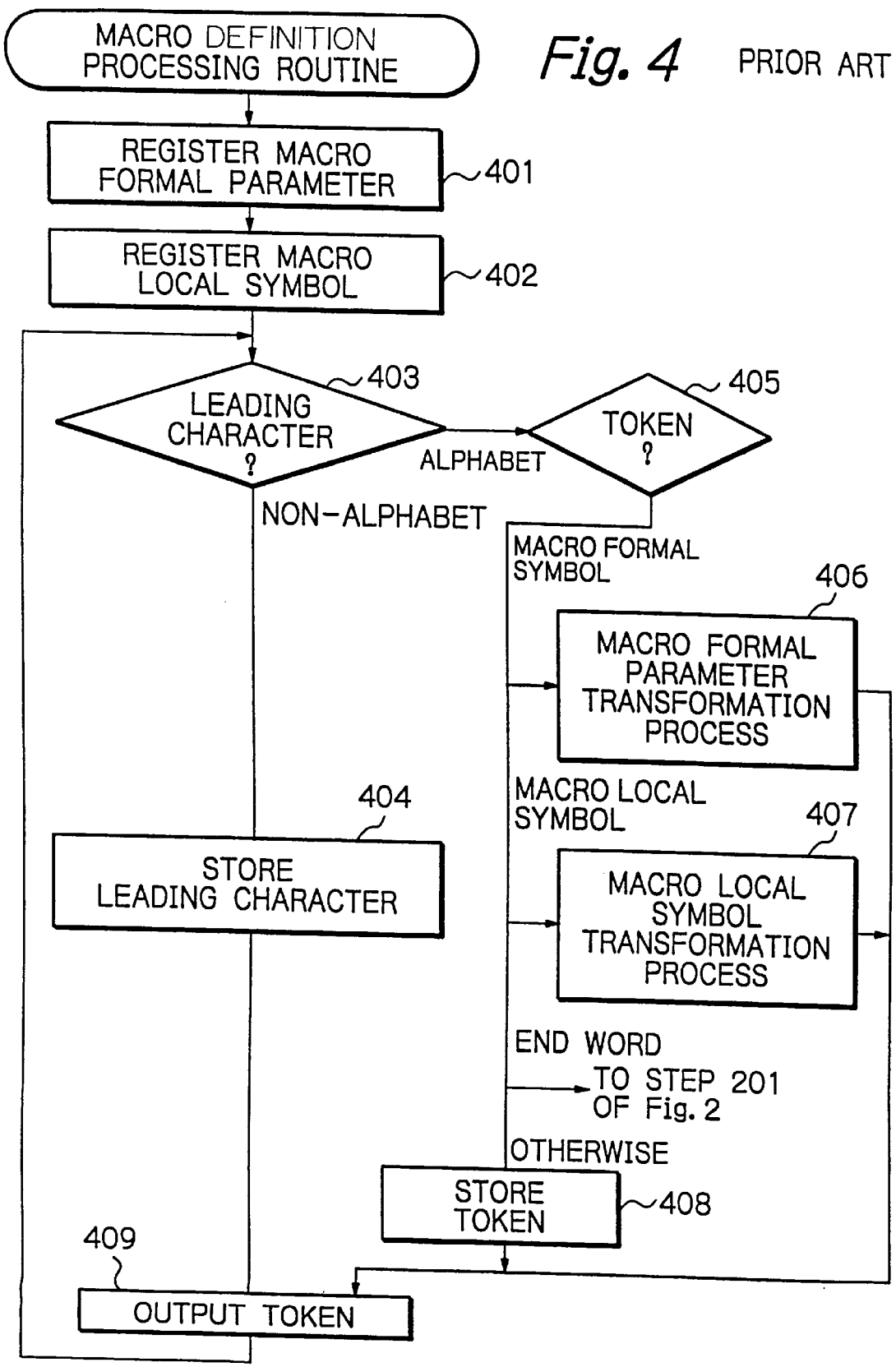
FIG. 4 is a detailed flowchart of the macro definition processing step of FIG. 2.

The macro definition processing step 204 of FIG. 2 is explained next with reference to FIG. 4.

First, at step 401, the macro formal parameter is analyzed and registered in the macro symbol table 22c.

Next, at step 402, the macro local symbol is analyzed and registered in the macro symbol table 22c.

At step 403, it is determined whether the leading character of the macro definition program body is an alphabetic character or a non-alphabetic character. As a result, if the leading character is a non-alphabetic character, the control proceeds to step 404 which stores the leading character into the output buffer 23a. On the other hand, the leading character is an alphabetic character, the control proceeds to step 405.

At step 405, a token is read, and it is determined if the token is a macro formal parameter, a macro local symbol or a macro definition end word. As a result, if the token is a macro formal parameter, the control proceeds to step 406 which carries out a macro formal parameter transforming process. Also, if the token is a macro local symbol, the control proceeds to step 407 which carries out a macro local symbol transforming process. Further, if the token is a macro definition end word, the control proceeds to step 201 of FIG. 2. Otherwise, the control proceeds to step 408 which stores the token into the output buffer 23a.

At step 406, the macro formal parameter is transformed into a character string starting with a metacharacter representing the macro formal parameter, and then, the character string is stored in the output buffer 23a.

At step 407, the macro local symbol is transformed into a character string starting with a metacharacter representing the macro local symbol, and then, the character string is stored in the output buffer 23a.

At step 409, the leading character or the character string stored in the output buffer 23a is output to the macro definition memory 22a, and then, the control returns to step 403.

Figure 5B:
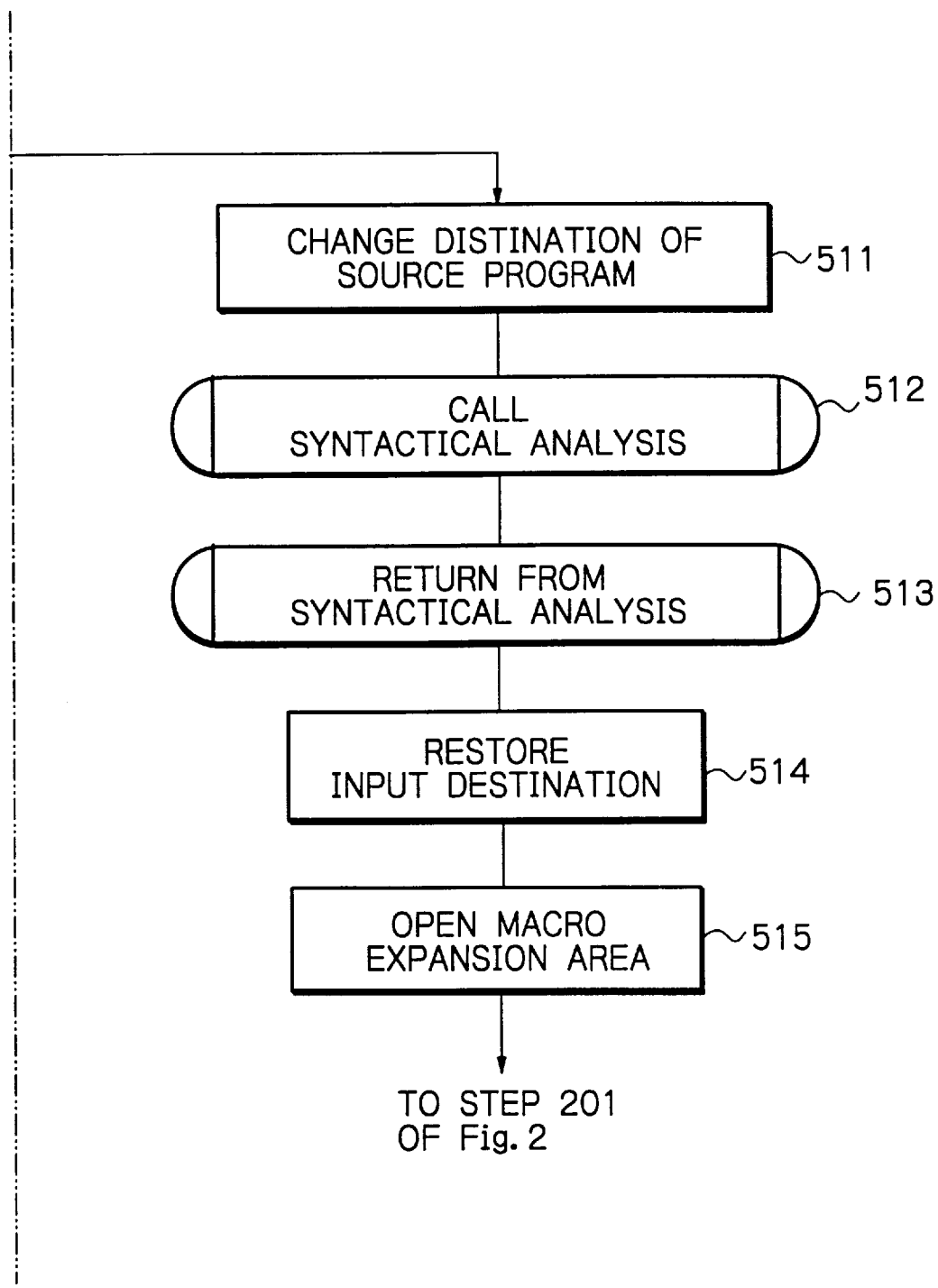

The macro reference processing step 205 of FIG. 2 is explained next with reference to FIG. 5.

First, at step 501, the macro reference row is analyzed, and as a result, the value of the macro actual parameter obtained by the analysis is set in a macro formal parameter entry area of the macro symbol table 22c.

Next, at step 502, it is determined whether there is an area for the maximum value of the token in the macro expansion area 22b. As a result, if there is no such area, the control proceeds to step 503 which adds a continuous extension of the macro expansion area 22b thereto.

Next, at step 504, it is determined whether or not the read position of the macro definition area 22a is the end position of the macro definition area 22a. As a result, if the read position is the end position the macro definition area 22a, the control proceeds to step 511. On the other hand, if the read position is not the end position definition area 22a, the control proceeds to step 505.

At step 505, it is determined whether or not the character at the position that has been read in the macro definition area 22a is a metacharacter. As a result, if the character is a metacharacter, the control proceeds to step 506. On the other hand, if the character is not a metacharacter, the control proceeds to step 510.

At step 506, a token is taken out from the position that has been read in the macro definition area 22a, and, it is determined whether the token is a macro formal parameter or a macro local symbol. As a result, if the token is a macro formal parameter, the control proceeds to step 507. On the other hand, if the token is a macro local symbol, the control proceeds to steps 508 and 509.

At step 507, the character string starting with a metacharacter representing the formal parameter is replaced by an actual parameter and is stored in the output buffer 23a. Then, the control proceeds to step 510.

At step 508, a symbol name different from any other symbol names that have already been used is generated. Then, at step 509, the character string starting with a metacharacter representing the macro local symbol is replaced by the generated symbol name and is stored in the output buffer 23a. Then, the control proceeds to step 510.

At step 510, the character string stored in the output buffer 23a is output to the macro expansion area 22b.

At step 511, the input destination of the source program file 1 for the lexical analysis is retained and thereafter, is shifted to the macro expansion area 22b.

At step 512, a syntactical analysis routine of FIG. 2 is called, and at step 513, the control returns from the analysis routine of FIG. 2. Then, at step 514, the input destination of the source program file 1 for the lexical analysis is restored to the input destination retained at step 511, and then, the control proceeds to step 515.

At step 515, the macro expansion area 22b is opened, and then, the control returns to step 201 of FIG. 2.

An example of the source program file 1 is illustrated in FIG. 6. The file 1 includes eight rows, of which the rows from the first to the sixth are used for macro definition using the macro name of "ml" and the seventh row is used for referring to the macro "ml".

In the first row, "macro" is a reserved word indicating macro definition rows. When a symbol name is put before "macro", it becomes a macro name. When, on the other hand, a symbol name is put after "macro", it becomes a macro local symbol.

In the second row, "local" is a reserved word indicating a pseudo instruction (assembler instruction). When a symbol name is put after "local", it becomes a macro local symbol.

In the third row, "mov" is a reserved word of a machine language and "#" in the same row is a qualifier of an operand.

In the fourth row, "lab:" is a variable.

In the fifth row, "br" is a reserved word of the machine language and "!" is a qualifier of the operand.

In the sixth row, "endm" is a reserved word indicating the end of the macro definition.

In the seventh row, "10110110b" is a binary numeral.

In the eighth row, "end" is a reserved word indicating the end of the entire source program to be subjected to an assembling processing.

Now, the macro definition processing routine of FIG. 4 for above source program of FIG. 6 will be further described with reference to FIG. 7 (A) which shows an example of the macro definition area 22a.

Firstly, at step 401, the macro formal parameter "paral" is processed for registration. Then, at step 402, the macro local symbol "lab" is processed for registration and then an end of macro definition area determining processing step 503 is executed.

Figure 7:
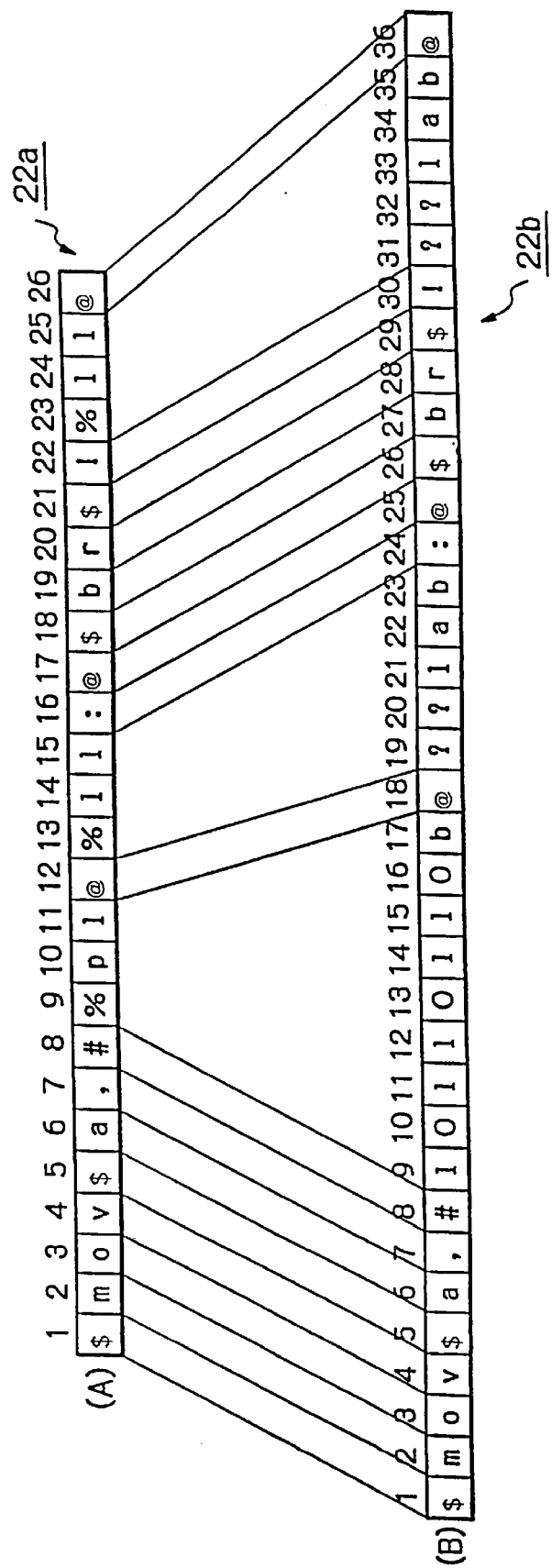
FIG. 7 is a diagram showing the contents of the macro definition area and the macro expansion area of FIG. 1.

Under this condition, the source program file 1 is read at the position of the leading character of the 3rd row, which is a tab, so that the macro definition token output processing step 409 is executed to output the tab to the macro definition area 22a (see the 1st character of FIG. 7 (A)). Then, the leading character determining step 403 is executed.

Since the next character is "m" which is an alphabetic character, the macro symbol token determining step 405 is executed. In the macro symbol token determining step 405, the token "mov" is taken out.

Since the token "mov" is not any of a macro formal parameter, a macro local symbol and a macro end word, the macro definition area token outputting step 409 is then executed.

In the macro definition area token outputting step 409, the token "mov" is output to the macro definition area 22a (see the characters from the 2nd to the 4th in FIG. 7 (A)), and the leading character determining step 402 is resumed.

When the leading character of the token is not an alphabetic character or when the token is not any of a macro formal parameter, a macro local symbol and a macro end word, a macro definition processing as described above will also be executed.

In a similar manner, the characters down to the leading character of token "paral" in the 3rd row are output to the macro definition area 22a (see the characters from the 5th to the 8th in FIG. 7 (A)).

The processing from the leading character of the token "paral" in the 3rd row will be as follows. In the leading character determining step 403, the character "p" is determined to be an alphabetic character and the macro symbol token determining step 405 is executed.

In the macro symbol token determining step 405, the token "paral" is taken out. Since the token "paral" is a macro formal parameter, the macro formal parameter transformation step 406 is then executed.

In the macro formal parameter transformation step 406, "paral" is replaced by a character string "%p1" that starts with the metacharacter "%" representing the first macro formal parameter, and then a macro definition area token outputting step 409 is executed.

In the macro definition area token outputting step 409, the character string "%p1" is output to the macro definition area 22a (see the characters from the 9th to the 11th in FIG. 7 (A)) and then the leading character determining step 403 is resumed.

Then, a processing for a token that has a non-alphabetic leading character or that is not any of a macro formal parameter, a macro local symbol and a macro end word is executed and the characters down to the leading character of the 4th row are output to the macro definition area 22a (the 12th character in FIG. 7 (A)).

The processing from the leading character of the token "lab" of the 4th row will be as follows.

Firstly, the character "1" is determined to be an alphabetic character in the leading character determining step 403, and then the macro symbol token determining step 405 is executed.

In the macro symbol token determining step 405, the token "lab" is taken out. Since the token "lab" is a macro local symbol, the macro local symbol transformation step 406 is then executed.

In the macro local symbol transformation step 406, "lab" is replaced by a character string "%l1" that starts with the metacharacter "%" representing the first macro local symbol, and then the macro definition area token outputting step 409 is executed.

In the macro definition area token outputting step 409, the character string "%l1" is output to the macro definition area 22a (see the characters from the 13th to the 15th in FIG. 13 (A)), and then the leading character determining step 403 is resumed.

Then, a processing for a token that has a non-alphabetic leading character or that is not any of a macro formal parameter, a macro local symbol and a macro end word is executed and the characters down to the leading character of the token "lab" in the 5th row are output to the macro definition area 22a (see the characters from the 16th to the 22th in FIG. 7 (A)).

Since the token "lab" in the 5th row is a macro local symbol, it is subjected to a processing similar to the above described one. Then, it is replaced by the character string "%l1" and output to the macro definition area 22a (see the characters from the 23th to the 25th in FIG. 7 (A)).

Then, a processing for a token that has a non-alphabetic leading character or that is not any of a macro formal parameter, a macro local symbol and a macro end word is executed and the characters down to the character immediately before the token "endm" in the 6th row are output to the macro definition area 22a (see the 26th character in FIG. 7 (A)).

The processing from the leading character of the token "endm" in the 6th row will be as follows.

In the leading character determining step 403, the character "e" is determined to be an alphabetic character and the macro symbol token determining step 405 is executed. In the macro symbol token determining step 405, the token "endm" is taken out.

Since the token "endm" is a macro end word, the macro definition processing is terminated at this point and the original syntactical analysis routine of FIG. 2 is resumed.

Thus, the macro definition area 22a as shown in FIG. 7 (A) is created with the above described sequential processings.

Now, the macro reference processing routine of FIG. 5 for the source program of FIG. 6 will be further described with reference to FIG. 7(B) which shows an example of the macro expansion area 22b.

The macro reference row is "ml 10110110b" and the first actual parameter is registered as "10110110b" in the macro actual registering step 501, and the control moves to the end of macro expansion area determining step 502. In the end of macro expansion area determining step 502, it is determined whether or not there is an area for the maximum value of the token in the macro expansion area 22b. Since the macro expansion area 22b is not secured at all yet, it is determined that there is no area for the maximum value of the token, and then the expansion area securing step 503 is executed. In the macro expansion area securing processing 503, a memory area having a predetermined size is secured, and then the end position of macro definition area determining step 504 is executed.

In the end position of macro definition area determining step 504, it is determined whether or not the position of the macro definition area 22a that has been read points to the end position of the macro definition area 22a. Since the position that has been read is the first row of the macro definition area 22a, the metacharacter determining step 505 will be executed.

In the metacharacter determining step 505, it is determined whether or not the character at the position that has been read is a metacharacter. As a result, since a tab is not a metacharacter, the macro expansion area token output step 510 will then be executed.

In the macro expansion area token output processing 510, the tab is output to the macro expansion area 22b, and then the end of macro definition area determining step 504 is resumed.

If the character at the position of the macro definition area 22a that has been read is not a metacharacter, a macro reference processing will be executed in a manner as described above.

The characters down to the 8th one in the macro definition area 22a of FIG. 7(A) are output to the expansion area 22b in a manner as described above (see the characters from the 1st to the 8th in FIG. 7(B)). The characters from the 9th and on in the macro definition area 22a of FIG. 7(A) will be processed in a manner as will be described below. Since it is determined in the end position of macro definition area determining step 504 that the position that has been read is not an end, the control proceeds to the metacharacter determining step 505. Since it is determined in the metacharacter determining step 505 that the character at the position of the macro definition are 22a that has been read is a metacharacter, the macro symbol token determining step 506 is executed.

In the macro symbol token determining step 506, the token "%p1" is taken out. Since the token "%p1" is a macro formal parameter, it is subjected to the macro actual parameter replacement step 507. In the actual parameter replacement step 507, the token "%p1" is replaced by "10110110b", and then the macro expansion token outputting step 510 will be executed.

In the macro expansion token outputting step 510, the token "10110110b" is output to the macro expansion area 22b (see the characters from the 9th to the 17th in FIG. 7(B)), and the control proceeds to the end position of macro definition area determining step 504.

Then, a processing will be executed for a case where the character at the position of the macro definition area 22a that has been read is not a metacharacter and the characters down to the 12th one of the macro definition area 22a are output to the macro expansion area 22b (see the 18th character in FIG. 7(B)).

The characters from the 13th of the macro definition area 22a are processed in a manner as will be described below.

In the end position of macro definition area determining step 504, the control proceeds to a metacharacter determining step 505 because the position that has been read does not point to the end position.

In the metacharacter determining step 505, the control proceeds to the macro symbol token determining step 506, because the character at the position of the macro definition area 22a that has been read is a metacharacter. The token "%l1" is taken out in the macro symbol token determining step 506. Since the token "%l1" is a macro local symbol, the local symbol generation step 508 will be executed.

In the local symbol generation step 508, symbol name "??lab" that is different from any other symbol names is generated, and then the macro local symbol replacement step 509 is executed.

In the macro local symbol replacement step 509, the token "%l1" is replaced by "??lab", and then the macro expansion token outputting step 510 is executed (see the characters from the 19th to the 23th in FIG. 7(B)).

Then, a processing will be executed for a case where the character at the position of the macro definition area 22a that has been read is not a metacharacter and the characters down to the 22nd one of the macro definition area 22a are output to the macro expansion area 22b (see the characters from the 24th to the 30th in FIG. 7(B)).

Since the token "%l1" of the characters from the 23rd of the macro definition area 22a is a macro local symbol, it is replaced by token "??lab" in a processing similar as the above described one and output to the macro expansion area 22b (see the characters from the 31st to the 35th in FIG. 7(B)).

Then, a processing will be executed for a case where the character at the position of the macro definition area 22a that has been read is not a metacharacter, and the characters down to the 26th of the macro definition area 22a are output to the macro expansion area 22b (see the 36th character in FIG. 7(B)).

Thereafter, the end position of macro definition area determining step 504 is executed. Since the position of the macro definition area 22a that has been read is found to be pointing to the end position of the macro definition area 22a in the end position of macro definition area determining step 504, the control proceeds to the input destination shifting step 511.

Thus, the macro expansion area 22b as shown in FIG. 7(B) is generated as a result of the above processing operation.

In the input destination shifting step 511, the input destination of the lexical analysis step 201 is retained, and then it is replaced by the macro expansion area 22b before the syntactical analysis routine of FIG. 2 is invoked.

In the syntactical analysis routine of FIG. 2, the macro expansion area 22b is syntactically analyzed and, after returning from the syntactical analysis routine of FIG. 2, the control proceeds to the input destination restoring step 512. In the input destination restoring step 512, the input destination of the retained source program file is restored, and then the macro expansion area opening step 515 is executed. In the macro expansion area opening step 515, the macro expansion area 22b is opened, and thus, the macro reference processing is terminated.

With the above described prior art assemble processing system, however, the macro expansion processing requires a considerably long time to generate a macro expansion area 22b. That is, the time required by the macro expansion processing is mainly consumed for determining the token being referenced to the entire macro and for copying the entire macro reference.

As a specific example, if a macro having 1,000 steps for definition is referred to ten times, the time necessary for a macro expansion processing will be $$10 \cdot (T_1 + T_2) + T_3$$

where $T_1$ is a time necessary for determining tokens within one macro definition (or a time for determining tokens with 1,000 steps (ordinary rows not describing macro formal parameters nor macro local symbols)), $T_2$ is a time necessary for copying one macro reference, and $T_3$ is a Lime necessary for determining tokens within one macro definition (or a time for determining tokens with 1,000 steps).

Figure 8:
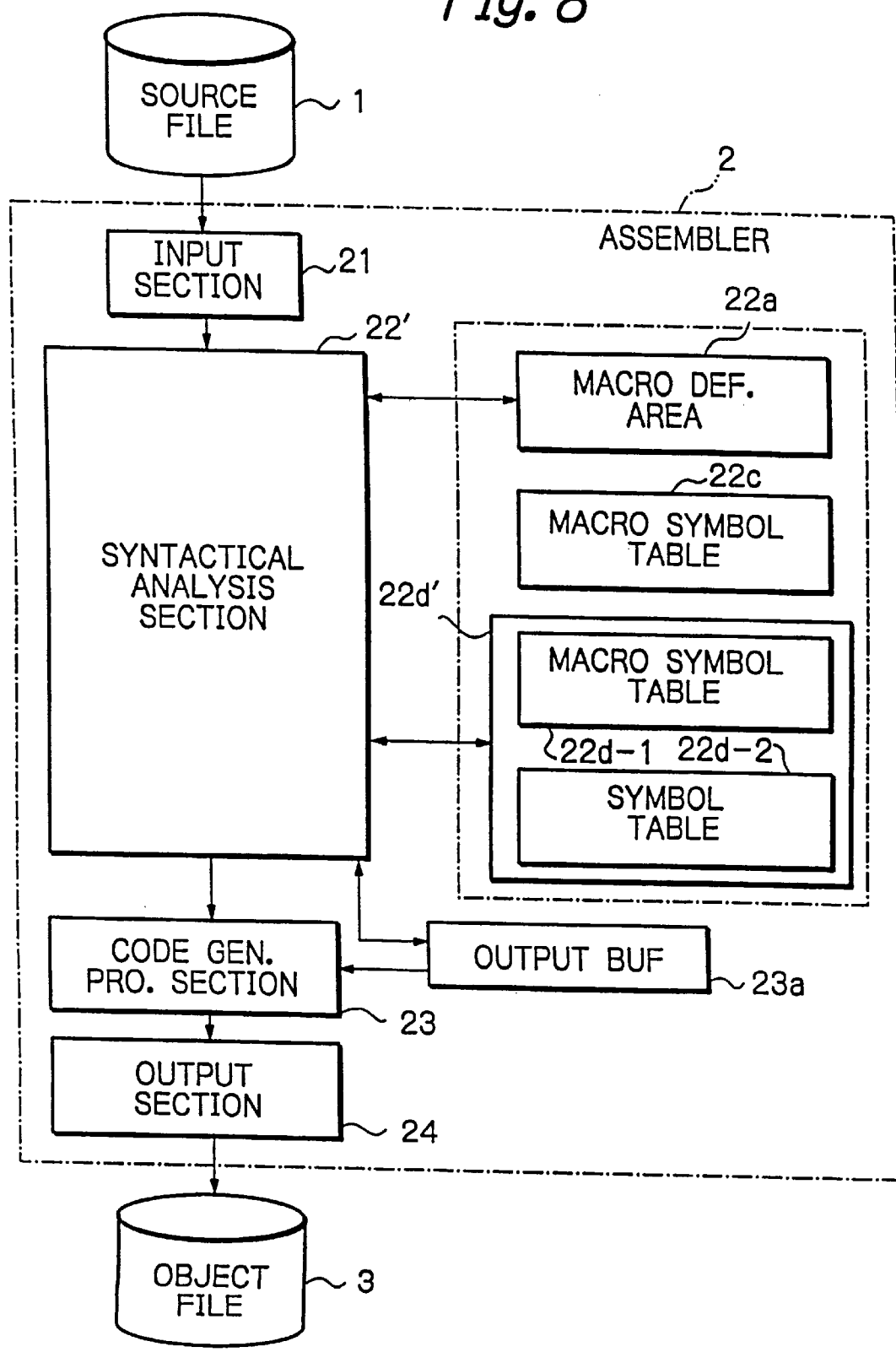
FIG. 8 is a diagram illustrating an embodiment of the assemble processing system according to the present invention.

In FIG. 8, which illustrates an embodiment of the present invention, the syntactical analysis section 22 of FIG. 1 is modified into a syntactical analysis section 22'. Also, the macro expansion area 22b of FIG. 1 is not provided. Further, the symbol table 22d of FIG. 1 is replaced by a symbol table 22d' which has a macro formal parameter entry 22d-1 and a macro local symbol entry 22d-2.

The syntactical analysis section 22' causes a lexical analysis routine Lo carry out a lexical analysis, to access and reference symbols.

When the syntactical analysis section 22' finds a macro definition row, the syntactical analysis section 22' calls a macro definition processing routine. On the other hand, when the syntactical analysis section 22' finds a macro reference row, the syntactical analysis section 22' calls a macro reference processing routine.

A macro-defined program body is stored by the macro definition processing routine into the macro definition area 22a. Also, a macro formal parameter and a macro local symbol are stored by the macro definition processing routine into the macro symbol table 22c.

The macro reference processing routine accesses and syntactical-analyzes the macro formal parameter as the macro parameter entry 22d-1 and the macro local symbol as the macro local symbol entry 22d-2 and, after the completion of the syntactical analysis processing, the macro formal parameter entry 22d-1 and the macro local symbol entry 22d-2 are deleted.

The syntactical analysis section 22' performs lexical analysis by way of a lexical analysis routine to perform a symbol registration and reference processing by way of a symbol processing routine.

The symbol processing routine registers the symbol in the symbol table 22d'.

The operation of the syntactical analysis section 22' of FIG. 8 will be explained next with reference to FIG. 9.

First, at step 201', tokens are taken out one by one from the source file 1 that has been read. Then, a lexical analysis process is carried out, which will be explained later in detail.

Next, at step 202, it is determined whether or not there is a syntactical agreement between the tokens and a predetermined language specification. As a result, if there is an syntactical agreement, the control proceeds to step 203. On the other hand, if there is no syntactical agreement, the control returns to step 201'

At step 203, the syntax is identified. As a result, if the syntax is a macro definition syntax, the control proceeds to step 204' which carries out a macro definition processing routine which will be explained later in detail. Also, if the syntax is a macro reference syntax, the control proceeds to step 205' which carries out a macro reference processing routine which will be explained later in detail. Further, if the syntax is an end syntax, the control proceeds to step 206 which is a code generation processing routine carried out by the code generation processing section 23. Otherwise, the control proceeds to steps 207-1, . . . , 207-n which carry out meaning analysis processing operations corresponding to each of the tokens.

Figure 9:
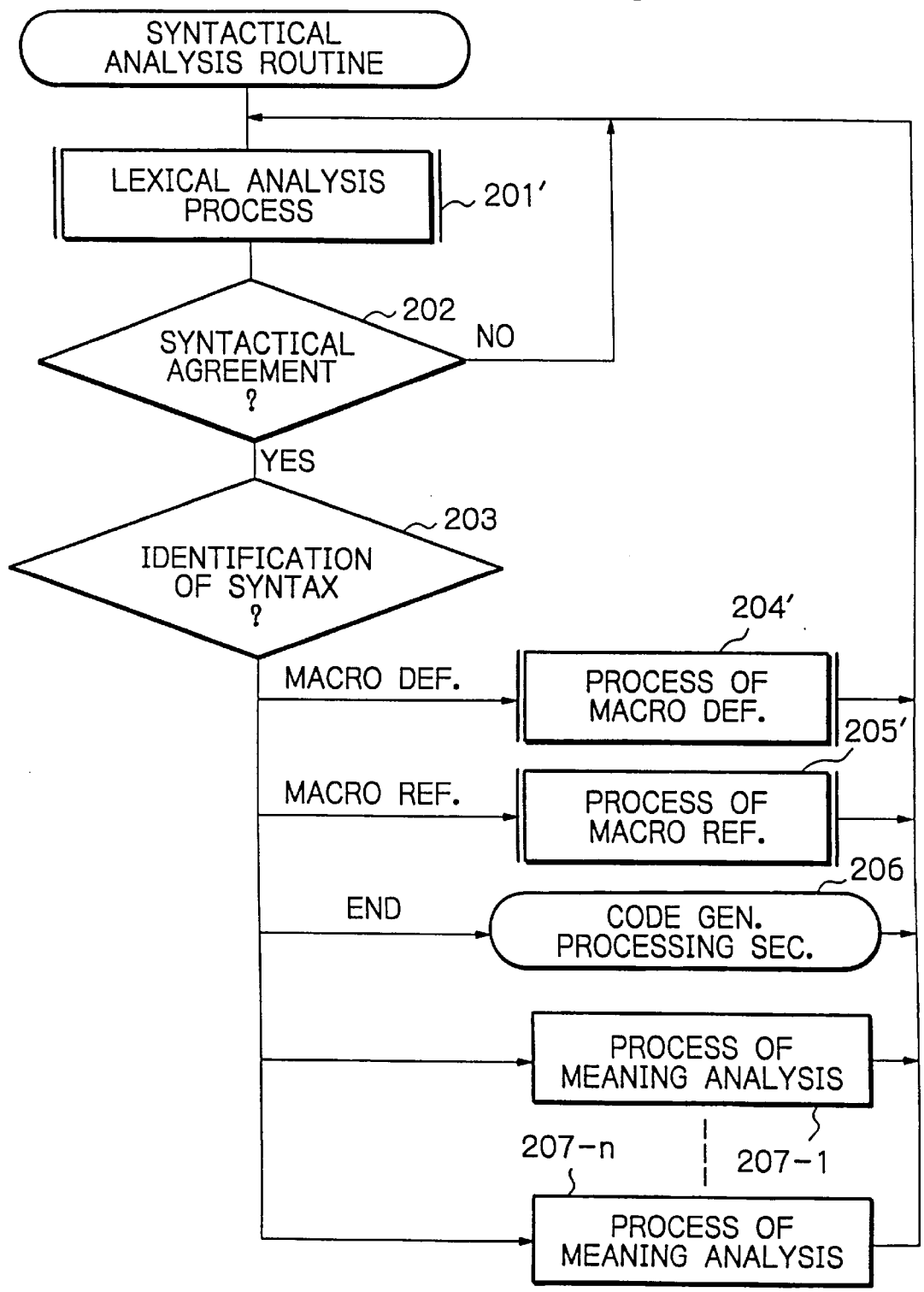
FIG. 9 is a flowchart showing the operation of the syntactical analysis section of FIG. 8.
Figure 10:
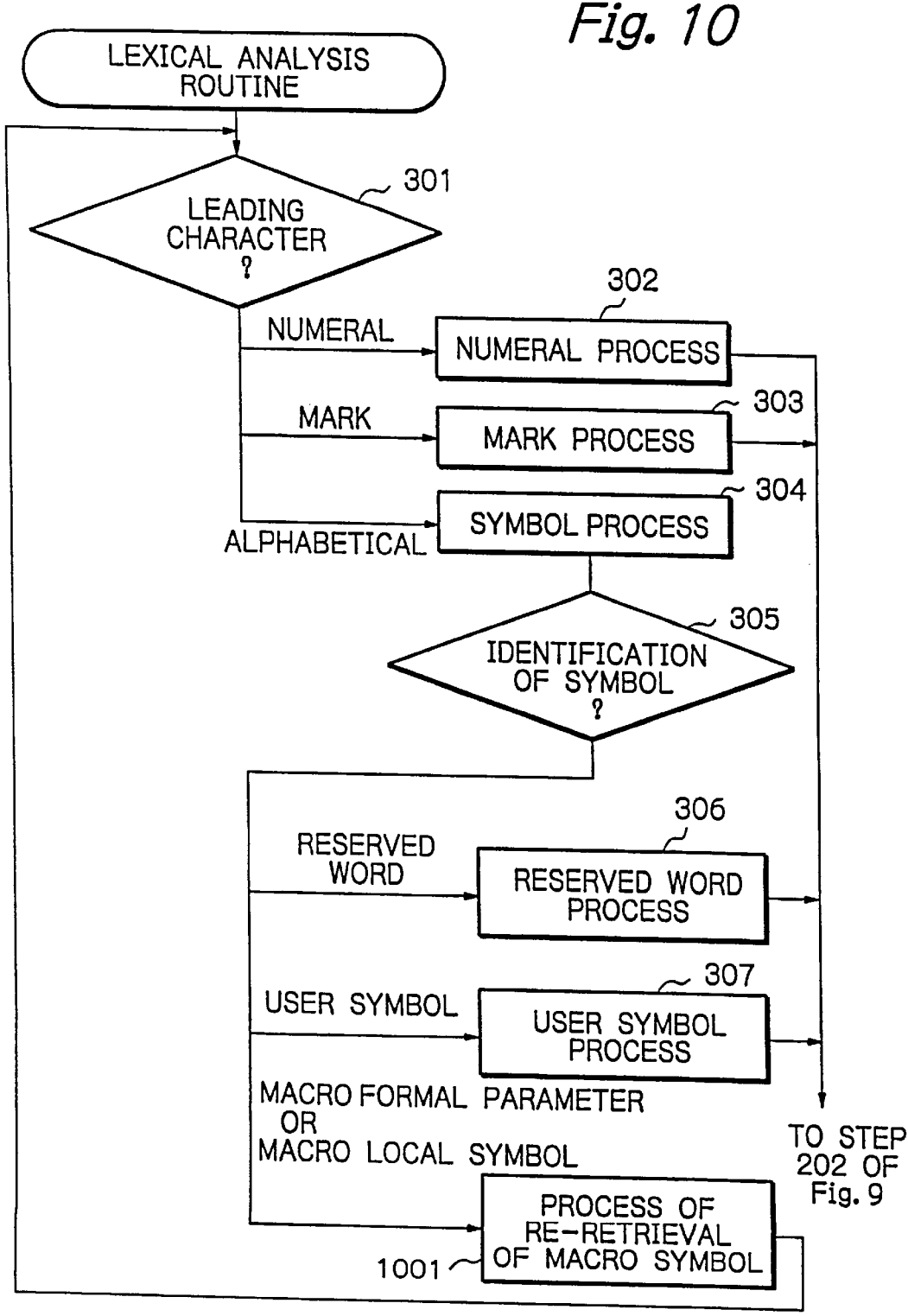
FIG. 10 is a detailed flowchart of the lexical analysis step of FIG. 9.

The lexical analysis processing step 201' of FIG. 9 is next explained in detail with reference to FIG. 10. In FIG. 10, step 1001 is added to the elements of FIG. 3.

First, at step 301, a leading character of each token is identified. As a result, if the leading character is a numeral, the control proceeds to step 302 which carries out a numeral processing operation. Also, if the leading character is a mark, the control proceeds to step 303 which carries out a mark processing operation. Further, if the leading character is an alphabetic character, the control proceeds to step 304 which carries out a symbol processing operation.

At step 302, characters down to a space are taken in, and a character string that has been taken in is processed as numerals. Then, the control proceeds to step 202 of FIG. 9.

At step 303, characters down to a space are taken in, and a character string that has been taken in is processed as marks. Then, the control proceeds to step 202 of FIG. 9.

At step 304, characters down to a space are taken in, and a character string that has been taken in is processed as symbols. At step 305, it is determined whether the symbols are a reserved word, a user symbol, a macro formal parameter or a macro local symbol. As a result, if the symbols are a reserved word, the control. proceeds to step 306 which carries out a reserved word processing operation. Also, if the symbols are a user symbol, the control proceeds to step 307 which carries out a user symbol processing operation. Then, the control at step 306 or 307 proceeds to step 202 of FIG. 9. Further, if the symbols are a formal parameter or a macro local symbol, the control proceeds to step 1001 which carries out a process of re-retrieving a macro symbol.

Figure 11:
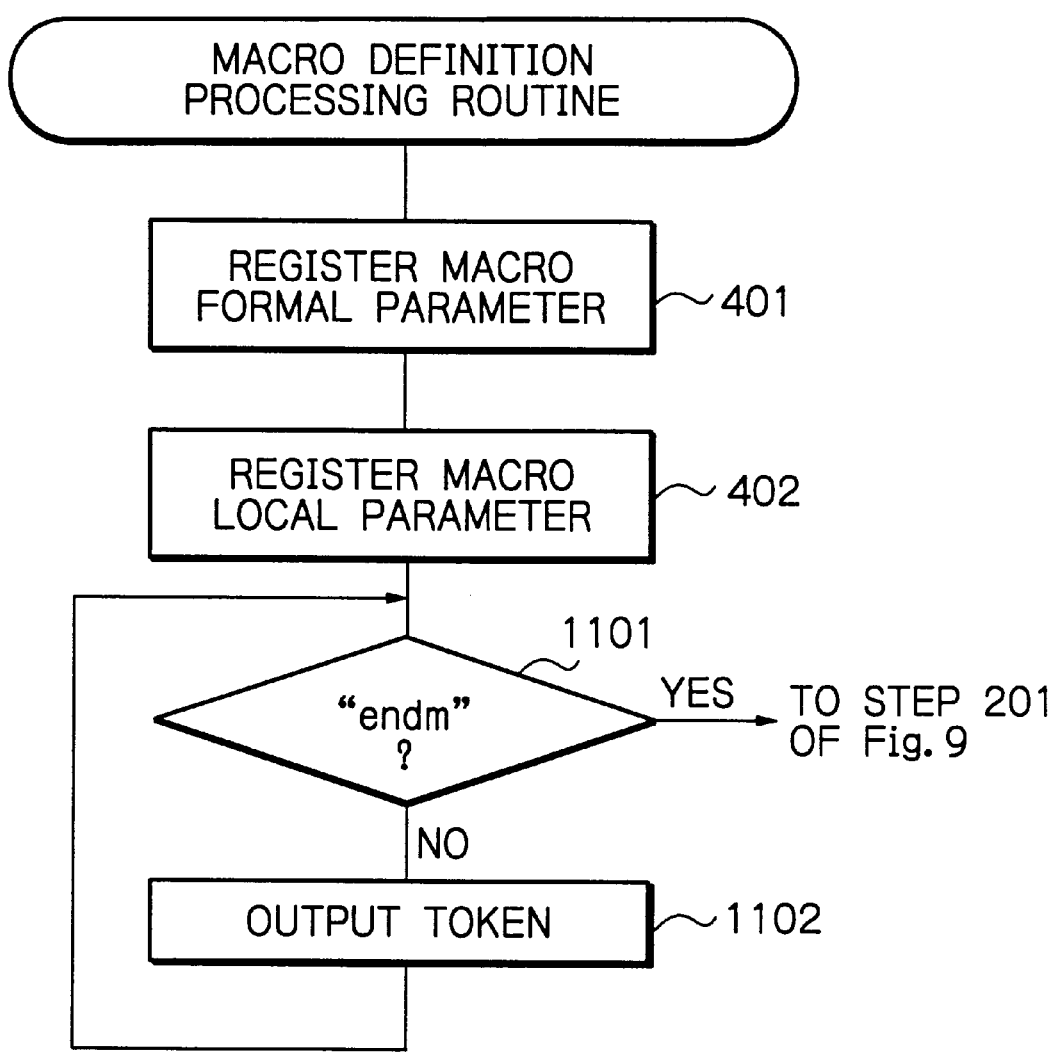
FIG. 11 is a detailed flowchart of the macro definition processing step of FIG. 9.

The macro definition processing step 204' of FIG. 9 is explained next with reference to FIG. 11. In FIG. 11, steps 1101 and 1102 are provided instead of steps 403 through 409 of FIG. 4.

First, at step 401, the macro formal parameter is analyzed and registered in the macro symbol table 22c.

Next, at step 402, the macro local symbol is analyzed and registered in the macro symbol table 22c.

Next, at step 1101, a token is read out, and it is determined whether or not the token is "endm". As a result, if the token is "endm", the control returns to step 201' of FIG. 9. On the other hand, if the token is not "endm", the control proceeds to step 1102.

At step 1102, the token stored in the output buffer 23a is output to the macro definition area 22a, and the control returns to step 1101.

Figure 12:
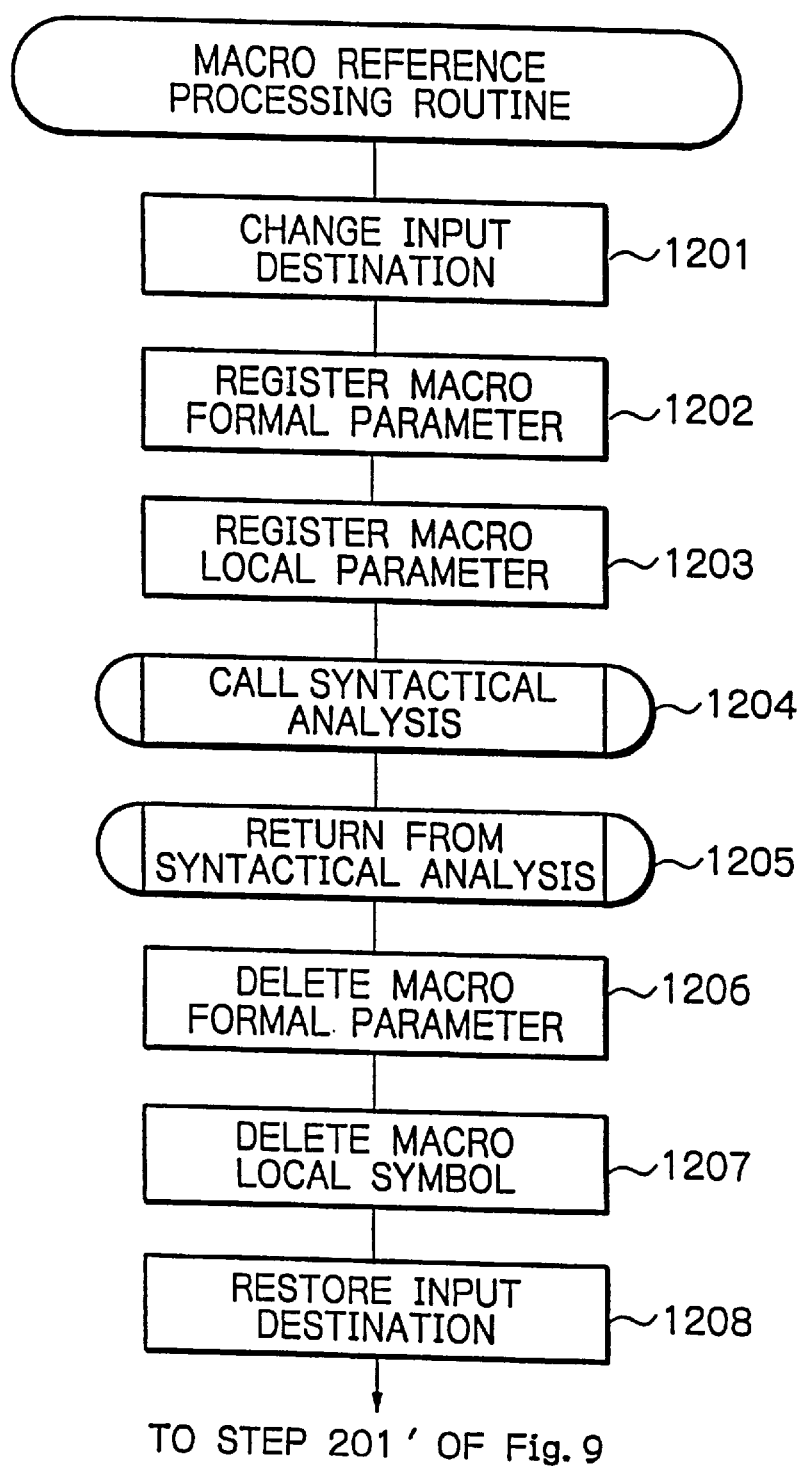
FIG. 12 is a detailed flowchart of the macro reference processing step of FIG. 9.

The macro reference processing step 205' of FIG. 9 is explained next with reference to FIG. 12.

First, at step 1201, the input destination of the lexical analysis is retained, and then is shifted to the macro definition 22a step.

Next, at step 1202, the macro reference row in the source program is analyzed, and each macro actual parameter obtained by the analysis is set in the macro formal parameter entry 22d-1, which macro formal parameter entry 22d-1 is then registered in the symbol table 22d'.

Next, at step 1203, a symbol name that differs from any other symbol name is generated and set to the macro local symbol entry 22d-2, which macro local symbol entry 22d-2 is then registered in the symbol table 22d'.

At step 1204, a syntactical analysis routine of FIG. 9 is called, and at step 1205, the control returns from the analysis routine of FIG. 9.

Next, at step 1206, the macro formal parameter entry 22d-1 is deleted from the symbol table 22d.

Next, at step 1207, the macro local symbol entry 22d-2 is deleted from the symbol table 22d.

Next, at step 1208, the input destination of the lexical analysis is restored as the input destination of the source program file 1 retained in the input destination shift step 1201 and then, the macro reference processing is terminated, and the control returns to step 201' of FIG. 9.

Now, the macro definition processing routine of FIG. 11 for above source program of FIG. 6 will be further described with reference to FIG. 13 which shows an example of the macro definition area 22a.

The macro definition area 22a is generated by the macro definition processing routine of FIG. 11 in a manner as described below.

First, macro formal parameter "paral" is registered at the macro formal parameter registering step 1101.

Then, macro local symbol "lab" is registered at the macro local symbol registering step 1102.

Thereafter, the end of macro definition area determining processing 1101 is executed. At seen from FIG. 6, the position at which the source program is read is the leading character of the third row, which is a tab and hence is not a macro end word, so that the macro definition area token output step 1102 will be executed to output the tab to the macro definition area 22a (see the 1st character in FIG. 13). Then, the end of macro definition area determining step 1101 is resumed.

The above processing procedure is followed for a macro definition processing when the token is not a macro end word. Therefore, the characters down to the leading character of token "endm" in the sixth row are output to the macro definition area 22a (see the characters from the 2nd to the 28th in FIG. 13).

The characters from the leading character of the token "endm" in the sixth row will be processed in a manner as described below.

In the end of macro definition area determining step 1101, the token "endu" is taken out. Since the token "endm" is a macro end word, the macro definition processing is terminated.

As explained hereinabove, according to the present invention, since it is unnecessary to generate a macro expansion area in a macro expansion processing, the total assemble processing time can be reduced. The time reduced due to the present invention is equal to the time for determining tokens within the entire macro reference plus the time for copying the entire macro reference in the prior art.

Additionally, the required memory capacity can be reduced, because it is unnecessary to generate a macro expansion area. The memory capacity reduced due to the present invention is equal to the maximum macro definition in the assembler program in the prior art.

As a specific example, if a macro having 1,000 steps for definition is referred to ten times, the time necessary for a macro expansion processing according to the present invention will be $T_3$ where $T_3$ is a time necessary for determining tokens within one macro definition (or a time for determining tokens with 1,000 steps).

The time necessary for determining tokens within one macro reference is equal to the time for determining tokens in one macro definition program.

Additionally, since the time necessary for determining tokens within one macro reference is five times greater than the time necessary for copying the macro reference, the time necessary for the prior art macro processing system and the comparable time with the system according to the present invention will show the following ratio:

$$10 \cdot (T_1 + (T_1/2)) + T_1 : T_1 = 13:1$$

Therefore, the time necessary for a macro processing according to the present invention will be reduced to one-thirteenth of the time with the prior art system.

I claim:

1. An assemble processing system comprising:
   a syntactical analysis means for syntactically analyzing a source program;
   a macro definition means for storing a macro definition program body of said source program in a macro definition area while said syntactical analysis means is operated; and
   a macro reference means for storing a macro formal parameter and a macro local symbol of said source program in a symbol table while said syntactical analysis means is operated,
   said macro reference means deleting said stored macro formal parameter and said macro local symbol from said symbol table after operation of said syntactical analysis means is completed.

2. The system as set forth in claim 1, further comprising a re-retrieving means for replacing at least one of a macro formal parameter and a macro local symbol found in a symbol of said source program by a corresponding macro actual parameter and a corresponding macro symbol and carrying out a symbol re-retrieving operation.

3. An assemble processing system comprising:
   a macro reference processing means for registering a macro local symbol entry and a macro formal parameter entry in a symbol table at the time of macro reference and shifting an input destination of lexical analysis to a macro definition program body of a macro definition area; and
   a re-retrieving means for replacing at least one of a macro formal parameter and a macro local symbol found in a symbol of said source program by a corresponding macro actual parameter and a corresponding macro symbol and carrying out a symbol re-retrieving operation.

4. An assemble processing system comprising a source file input means, a syntactical analysis means, a macro definition processing means, a macro reference processing means, a code generation processing means and an object file output means,
   said syntactical analysis means including a lexical analysis means, said lexical analysis means including a symbol processing means, said symbol processing means including a macro symbol re-retrieval processing means,
   said syntactical analysis means taking out a token in a source file, determining a syntax of said token and executing an appropriate one of a macro definition processing by said macro definition processing means, a macro reference processing by said macro reference processing means, a plurality of predetermined meaning analysis processings and an end processing on a basis of determination of the syntax of said token, said lexical analysis means determining a leading character of said token and executing an appropriate one of a numeral processing, a mark processing, and a symbol processing on a basis of determination of the leading character of said token, said symbol processing means determining a symbol of said token and executing a reserved word processing, a user symbol processing and macro symbol re-retrieval processing on a basis of determination of the symbol of said token, said macro analysis re-retrieval processing means branching to said lexical analysis means if the outcome of determining the symbol of said token refers to one of a macro formal parameter and a macro local symbol, said macro definition processing means executing a macro formal parameter registering processing, a macro local symbol registering processing, an end of macro definition area determining processing and a macro definition area token outputting processing, said macro reference processing means retaining a destination for said lexical analysis means to input said token, executing an input destination shift processing for shifting to a head of said macro definition area, a macro local symbol registering processing for analyzing a macro reference row taken out from said source file and registering a macro local symbol obtained by said analysis, a syntactical analysis processing of analyzing the syntax of said macro definition area and carrying out a macro expansion processing, a macro formal parameter deletion processing for deleting said registered macro local symbol and an input destination restoration processing for restoring said retained input destination for said lexical analysis processing means to input said token.

5. The assemble processing system as set forth in claim 4, wherein said syntactical analysis processing means comprises:

a first means for taking out said token from said source file by way of said lexical analysis processing means;

a second means for determining a syntactical agreement of said taken out token and a predetermined language specification and, if an agreement is determined, branching to said first means;

a third means for executing a syntax determining processing if an outcome of said second procedure agrees with said predetermined language specification;

a fourth means for executing said macro definition processing and branching to said first means if the outcome of said third means refers to the syntax of macro definition;

a fifth means for executing said macro reference processing and branching to said first means if the outcome of said third procedure refers to the syntax of macro reference;

a sixth means for terminating said syntactical analysis processing if the outcome of said third means refers to the syntax of end; and a seventh means of executing appropriate ones of said plurality of meaning analysis processings and branching to said first means if the outcome of said third means refers to any other syntax.

6. The assemble processing system as set forth in claim 4, wherein said lexical analysis processing means comprises:

a first means for taking out a leading character out of said source file by way of said source file input means and determining said leading character;

a second means for taking in characters down to a space and executing a numeral processing if an outcome of said first means refers to a numeral;

a third means for taking in characters down to a space and executing a mark processing if an outcome of said first means refers to a mark;

a fourth means for taking in characters down to a space and executing a symbol processing if the outcome of said first means refers to an alphabetic character;

a fifth means for executing a symbol determining processing;

a sixth means for executing a reserved word processing and terminating said lexical analysis processing if an outcome of said fifth means refers to a reserved word;

a seventh means for executing a user symbol processing and terminating said reserved word analysis processing if the outcome of said fifth means refers to a user symbol; and an eighth means for executing a macro symbol re-retrieval processing and branching to said first means if the outcome of said fifth procedure refers to a macro formal parameter or a macro local symbol.

7. The assemble processing system as set forth in claim 4, wherein said macro definition processing means comprises:

a first means for executing a macro formal parameter registering means of analyzing a macro definition row in a program recorded in said source file and registering the macro formal parameter obtained by said analysis into a macro symbol table;

a second means for executing a macro local symbol registering processing of analyzing said macro local symbol definition row in said program recorded in said source file and registering the macro local symbol obtained by said analysis into said macro local table;

a third means for executing an output processing of reading out a token from said source file and outputting said macro definition area token if it is found that said token is not a macro end word; and a fourth procedure for terminating said macro definition processing if it is found as a result of said third means that said token is a macro end word.

8. The assemble processing system as set forth in claim 4, wherein said macro reference processing means comprises:

a first means for executing an input destination shift processing of retaining an input destination of said lexical analysis means and shifting the input destination of said lexical analysis means to a macro expansion area;

a second means for executing a macro formal parameter registering processing of analyzing the macro reference row in said program recorded in said source file, selecting the values of the macro definition actual parameter obtained by the analysis for respective macro formal processing entry and registering said macro formal parameter entry into said symbol table;

a third means for executing a macro local symbol registering processing of generating symbol names different from any other symbol names that have already been used, selecting said generated symbol names for respective macro local symbol entry and accessing said macro local symbol entry into said symbol table;

a fourth means for calling and executing said syntactical analysis processing;

a fifth means for executing a macro formal parameter deletion processing of deleting said macro formal processing entry after executing said syntactical analysis processing;

a sixth means for local symbol deletion processing of deleting said macro local symbol entry from said symbol table; and a seventh means for restoring an input destination retained in said first means as input destination of said lexical analysis means.

* * * * *